(12) United States Patent
Park

(10) Patent No.: US 12,283,676 B2
(45) Date of Patent: Apr. 22, 2025

(54) BATTERY MODULE COOLING STRUCTURE

(71) Applicant: HYUNDAI MOBIS Co., Ltd., Seoul (KR)

(72) Inventor: Jae Seok Park, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 302 days.

(21) Appl. No.: 17/570,577

(22) Filed: Jan. 7, 2022

(65) Prior Publication Data

US 2022/0223942 A1 Jul. 14, 2022

(30) Foreign Application Priority Data

Jan. 8, 2021 (KR) .................. 10-2021-0002891

(51) Int. Cl.
*H01M 10/6556* (2014.01)
*H01M 10/613* (2014.01)
*H01M 10/625* (2014.01)
*H01M 10/647* (2014.01)

(52) U.S. Cl.
CPC ..... *H01M 10/6556* (2015.04); *H01M 10/613* (2015.04); *H01M 10/625* (2015.04); *H01M 10/647* (2015.04); *H01M 2220/20* (2013.01)

(58) Field of Classification Search
CPC .......... H01M 10/6556; H01M 10/613; H01M 10/625; H01M 10/647; H01M 2220/20
See application file for complete search history.

(56) References Cited

U.S. PATENT DOCUMENTS

| 10,424,820 B2* | 9/2019 | Kim .................. H01M 10/6568 |
| 2016/0079640 A1* | 3/2016 | Kim .................... H01M 10/613 |
| | | 429/120 |
| 2019/0118610 A1* | 4/2019 | Johnston ................ B60H 1/143 |
| 2022/0212566 A1* | 7/2022 | Vaddiraju ........... H01M 10/613 |
| 2023/0051254 A1* | 2/2023 | Azzouz ............. H01M 10/6557 |

* cited by examiner

*Primary Examiner* — Sean P Cullen
*Assistant Examiner* — Jonathan William Estes
(74) *Attorney, Agent, or Firm* — Morgan, Lewis & Bockius LLP

(57) ABSTRACT

The present disclosure relates to a battery module cooling structure which uniformly cools heat generated in a battery module, and a cooling block includes a first cooling module positioned at any one portion of upper or lower portions of a battery module and a second cooling module positioned at the other portion of upper or lower portions of the battery module.

14 Claims, 5 Drawing Sheets

BATTERY MODULE COOLING STRUCTURE

CROSS-REFERENCE TO RELATED APPLICATION

This application claims the benefit under 35 USC § 119(a) of Korean Patent Application No. 10-2021-0002891, filed on Jan. 8, 2021 in the Korean Intellectual Property Office, the entire disclosure of which is incorporated herein by reference for all purposes.

BACKGROUND

1. Technical Field

The present disclosure relates to a battery module cooling structure, and more specifically, to a battery module cooling structure which uniformly cools heat generated in a battery module.

2. Discussion of Related Art

Recently, as interest in environmental protection increases, instead of development of internal combustion engine vehicles using conventional combustion engines, development of other types of vehicles that are environmentally friendly and fuel-efficient, that is, hybrid vehicles and electric vehicles, is being actively conducted.

Since a hybrid vehicle is driven using two power sources in which a conventional engine and a motor, which is driven using electrical energy, are linked, the hybrid vehicle is positioned as an alternative next-generation vehicle which has been spotlighted recently in the United States, Japan, and Europe due to effects of reducing environmental pollution caused by exhaust gas and improving fuel efficiency.

Generally, in a hybrid vehicle, an engine driven by gasoline and diesel and used as a main power source and a motor used as auxiliary power source are used, and the hybrid vehicle travels using the engine as a power source at a predetermined speed or more and travels using the motor as a power source when traveling at a lower speed.

In addition, in an electric vehicle, a motor is mainly used as a main power source.

A battery management system (BMS) is used as a power source required for driving the motor, and the BMS acts as an important factor related to a lifetime of a hybrid vehicle and an electric vehicle.

The BMS is configured to supply power while repeating charging and discharging when a vehicle is traveling.

Generally, the BMS includes a plurality of battery modules.

In addition, each of the plurality of battery modules includes a plurality of pouch type battery cells and a cartridge supporting the plurality of pouch type battery cells.

When the conventional battery module is used for a long time, heat is generated, and particularly, in the case of a high-capacity battery, since an amount of current increases when the battery is charged or discharged, more heat is generated.

In this case, when the generated heat is not cooled sufficiently, the performance of the battery is degraded, or furthermore, the battery may also catch fire or explode.

Accordingly, the battery should be essentially cooled in order to maintain and improve the performance of the battery, and a battery cooling system is used in an eco-friendly vehicle in order to ensure a lifetime and the performance of a battery installed in the eco-friendly vehicles.

Such a battery cooling system is divided into an air cooling type battery cooling system using air, a water cooling type battery cooling system using cooling water, or a coolant cooling type battery cooling system using a coolant.

In addition, factors affecting the heat dissipation performance may be divided into external factors, such as air, cooling water, and a coolant as described above, and internal factors related to a heat dissipation structure of a battery cooling apparatus.

Meanwhile, the plurality of battery modules are positioned sequentially.

In addition, cooling water, which cools the battery modules, flows in a cooling module in contact with the battery modules from one side to the other side of the cooling module.

Accordingly, the battery modules are cooled in the order in which the cooling water passes.

Accordingly, when the cooling water flows into the cooling module, cooling efficiency of a battery module coming into contact with the cooling water at an initial stage is high.

However, the cooling water, of which a temperature is increased by exchanging heat with the battery module coming into contact with the cooling water at the initial stage, cools a battery module which will come into contact therewith relatively later.

Accordingly, there is a problem in that cooling efficiency of the battery module, which comes into contact with the cooling water at a later stage, is lower than that of the battery module, which comes into contact with the cooling water at the initial stage.

That is, a flow rate of the cooling water should be increased in order to control the battery module coming into contact with the cooling water at the later stage to have an optimum temperature.

Accordingly, there is a problem in that the battery module coming into contact with the cooling water at the initial stage is over cooled to decrease overall cooling efficiency of the BMS.

SUMMARY

The present disclosure is directed to providing a battery module cooling structure capable of cooling heat generated in a specific battery module to increase cooling efficiency of a battery management system (BMS).

The above-described objective, the other objectives, advantages, and features of the present disclosure and methods of achieving the same will be clear with reference to the following embodiments and the accompanying drawings.

According to an aspect of the present disclosure, there is provided a battery module cooling structure including a plurality of battery modules fixed to a vehicle body, a cooling block in which cooling water flows and which is in contact with the battery module to cool the battery module, and a plurality of valve members which are coupled to the cooling block and which control the cooling water to selectively flow in the cooling block, wherein the cooling block includes a first cooling module disposed at any one portion of upper or lower portions of the battery module, and a second cooling module positioned at the other portion of upper or lower portions of the battery module.

The second cooling module selectively may cool any one or all of the plurality of battery modules at the same time.

The first cooling module may include a first cooling plate which constitutes a body and in which the cooling water flows, an inlet pipe which is coupled to the first cooling plate and allows the cooling water to flow into the first cooling plate from the outside, an outlet pipe which is coupled to the first cooling plate at a position spaced apart from the inlet pipe and allows the cooling water to be discharged from the first cooling plate to the outside, a first connecting pipe having one end coupled to the first cooling plate and the other end coupled to the second cooling module, and a second connecting pipe disposed at a position spaced apart from the first connecting pipe and having one end coupled to the first cooling plate and the other end coupled to the second cooling module.

The first connecting pipe may communicate with the inlet pipe, and the second connecting pipe may communicate with the outlet pipe.

In the first connecting pipe, the cooling water may flow from the first cooling plate to the second cooling module, and in the second connecting pipe, the cooling water may flow from the second cooling module to the first cooling plate.

The second cooling module may include a plurality of second cooling plates of which the number corresponds to the plurality of the battery modules and in which the cooling water flows, a circulation path in which cooling water introduced into the second cooling plate flows, a discharge path in which the cooling water discharged from the second cooling plate flows, and a connection path which communicates with the circulation path and the discharge path and is connected to the first connecting pipe and the second connecting pipe.

The second cooling plate may include a body part in which an accommodation space is formed, an inlet part which allows the body part and the circulation path to communicate with each other, a discharge part which allows the body part and the discharge path to communicate with each other, and a cooling path which is positioned in the accommodation space of the body part and has one end coupled to the inlet part and the other end coupled to the discharge part.

The connection path may allow the cooling water introduced from the first connecting pipe to flow to the circulation path and the cooling water introduced from the discharge path to flow to the first cooling module through the second connecting pipe.

A partition wall may be positioned between the first connecting pipe and the discharge path in the connection path.

Each of the valve members may include an inlet valve which is coupled to the circulation path and controls the cooling water flowing in the circulation path and a discharge valve which is coupled to the discharge path and controls the cooling water flowing in the discharge path.

The inlet valve may communicate with the circulation path in one and the other directions and communicate with the inlet part in a direction in which the second cooling plate is positioned between the one and the other directions, and the discharge valve may communicate with the discharge path in one and the other directions and communicate with the discharge part in a direction in which the second cooling plate is positioned between the one and the other directions.

The inlet valve positioned at a position corresponding to the battery module to be cooled may open the circulation path in a direction in which the cooling water is introduced, close the circulation path in a direction in which the cooling water is discharged, and open the inlet part so that the cooling water flows into the cooling path.

The inlet valve positioned between the connection path and the battery module cooled by the second cooling plate may open the circulation path coupled to the inlet valve in the one and the other directions.

When the cooling water is discharged from the cooling path, the discharge valve may open the discharge part, close the discharge path in a direction in which the cooling water is introduced, and open the discharge path in a direction in which the cooling water is discharged so that the cooling water is discharged in a direction in which the connection path is positioned.

The discharge valve positioned between the connection path and the discharge valve of the battery module cooled by the second cooling plate may open the discharge path coupled to the discharge valve in the one and the other directions.

According to another aspect of the present disclosure, there is provided a battery module cooling structure including a plurality of battery modules fixed to a vehicle body, a cooling block which includes a first cooling module positioned at any one portion of upper or lower portions of the battery module and a second cooling module positioned at the other portion of upper or lower portions of the battery module and is in contact with the battery module to cool the battery module, a plurality of valve members which are coupled to the cooling block and control cooling water to selectively flow in the cooling block, and a plurality of support fixtures each having one end coupled to the first cooling module and the other end coupled to the second cooling module so that the second cooling module is supported by the first cooling module.

The first cooling module and the second cooling module may be connected to allow the cooling water to flow therebetween.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
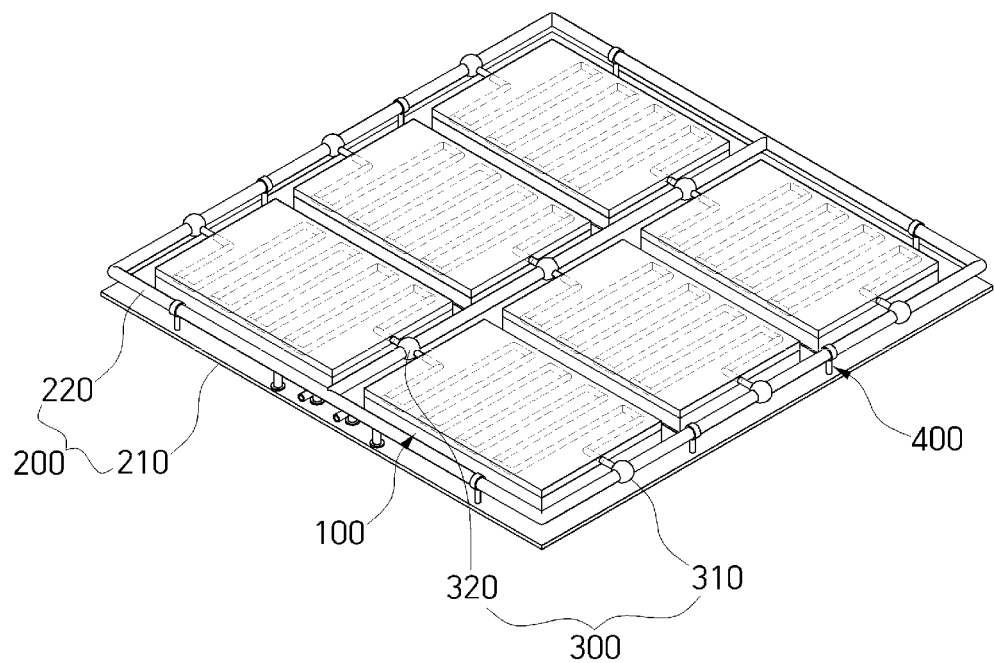
FIG. 1 is a perspective view illustrating a battery module cooling structure according to one embodiment of the present disclosure.

Embodiments of the present disclosure are provided to more completely describe the present disclosure to those skilled in the art, the embodiments described below will be changed into various different forms, and the scope of the present disclosure is not limited to the following embodiments. Further, the embodiments are provided to make the present disclosure more complete and true and to convey the spirit of the present disclosure to those skilled in the art. In addition, in the accompanying drawings, components are exaggerated for convenience and clarity of description, and components that are the same are referred to by the same reference numerals. As used in the present specification, the term "and/or" includes any and all combinations of the associated listed items.

The terms used herein are used only to describe the specific embodiments and are not to limit the present disclosure.

Unless the context clearly indicates otherwise, the singular forms described in the specification include the plural forms. In addition, the terms "comprise" and "comprising," when used herein, specify some stated shapes, numbers, steps, operations, members, elements, and/or presence of groups thereof but do not preclude one or more other shapes, numbers, operations, members, elements, and/or presence or addition of groups thereof.

Hereinafter, exemplary embodiments of the present disclosure will be described in detail with reference to the accompanying drawings.

Figure 2:
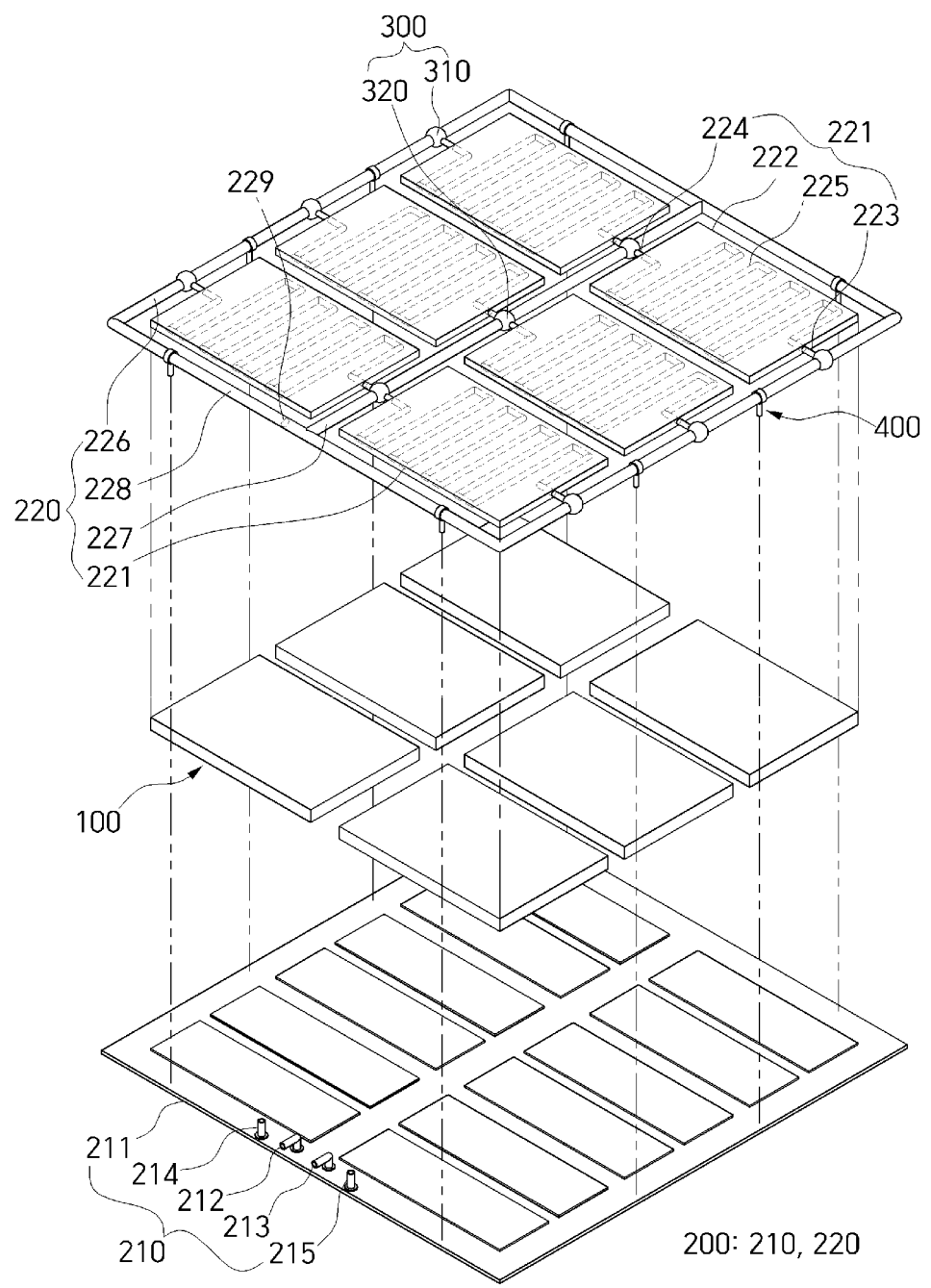
FIG. 2 is an exploded perspective view illustrating the battery module cooling structure according to one embodiment of the present disclosure.
Figure 3:
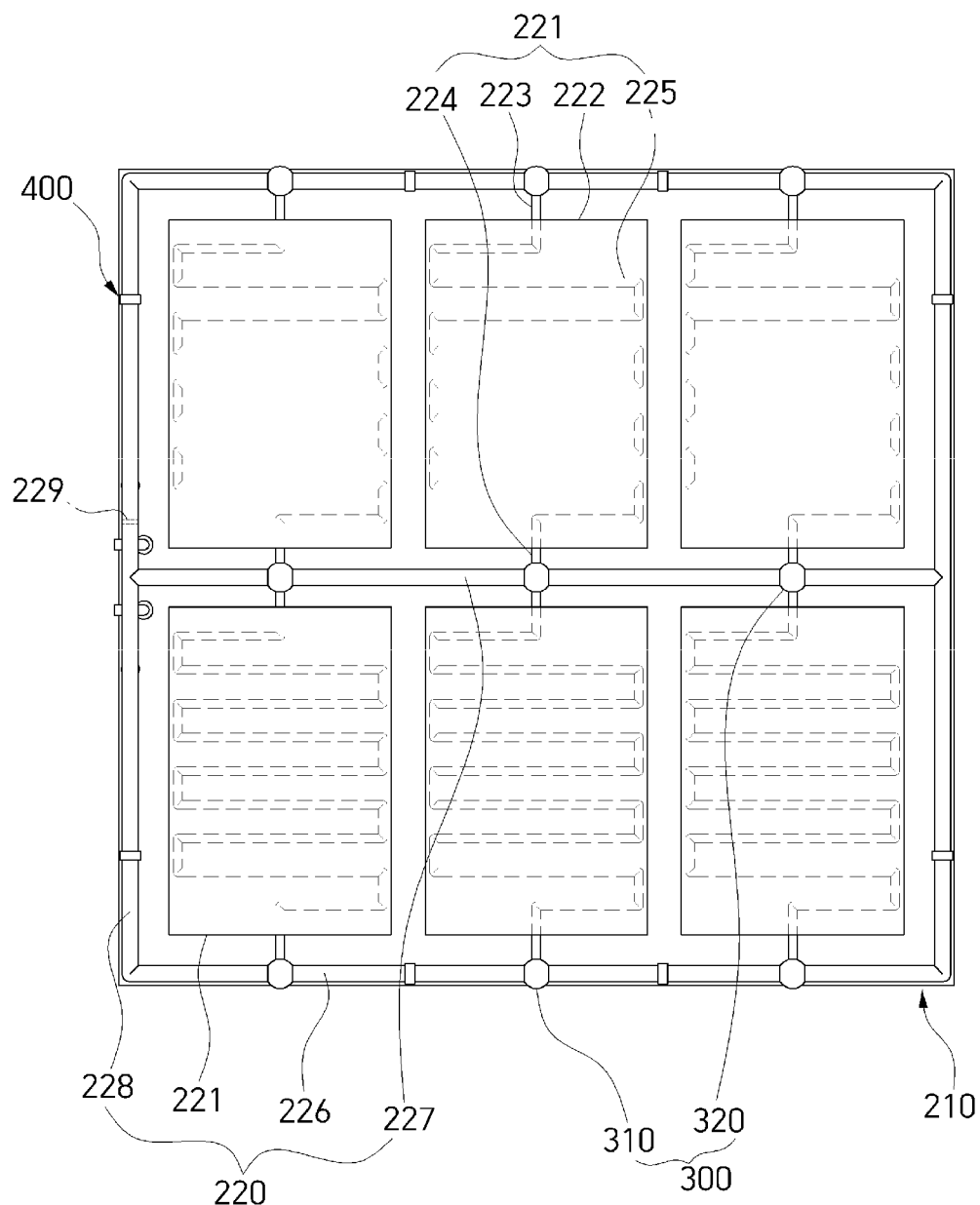
FIG. 3 is a plan view illustrating the battery module cooling structure according to one embodiment of the present disclosure.
Figure 4:
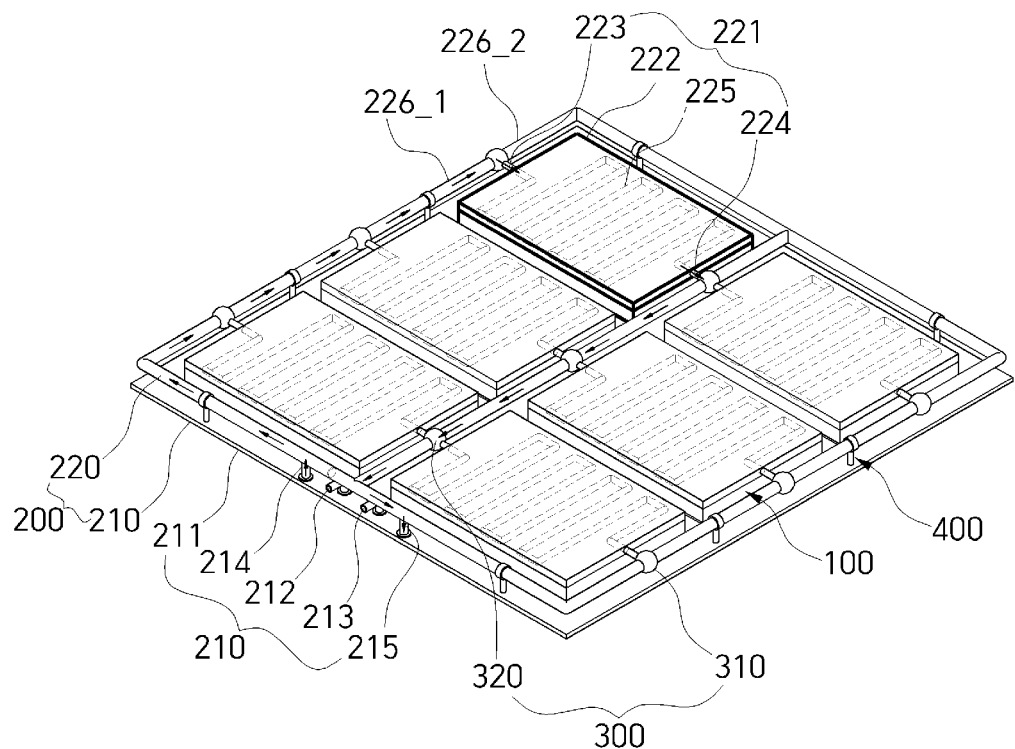
FIGS. 4 and 5 are perspective views illustrating a flow of cooling water flowing in the battery module cooling structure according to one embodiment of the present disclosure.
Figure 5:
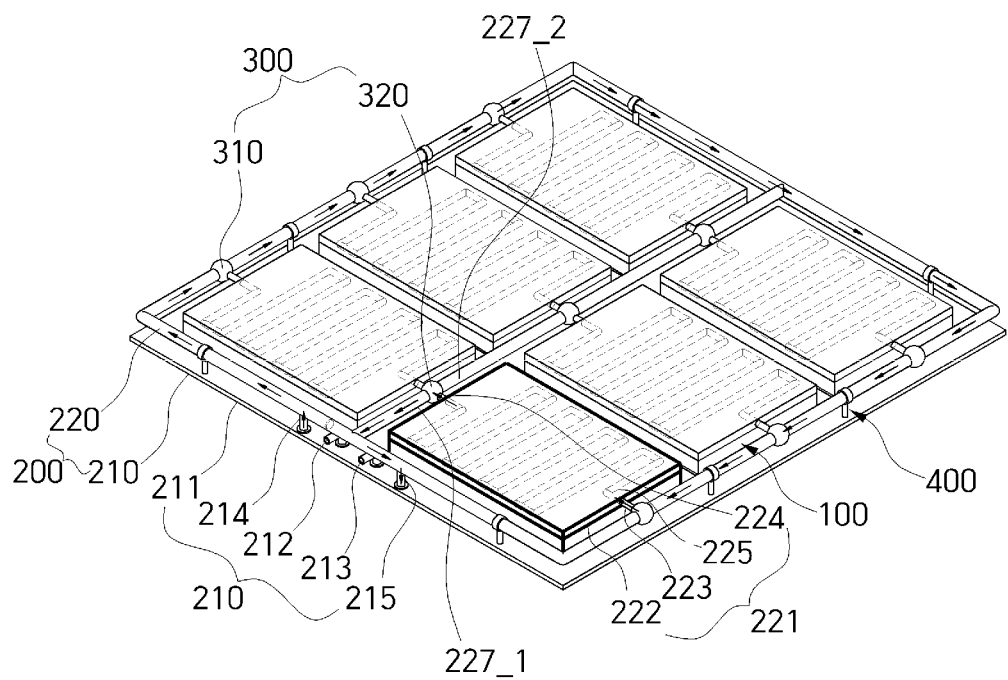

FIG. 1 is a perspective view illustrating a battery module cooling structure according to one embodiment of the present disclosure, FIG. 2 is an exploded perspective view illustrating the battery module cooling structure according to one embodiment of the present disclosure, FIG. 3 is a plan view illustrating the battery module cooling structure according to one embodiment of the present disclosure, and FIGS. 4 and 5 are perspective views illustrating a flow of cooling water flowing in the battery module cooling structure according to one embodiment of the present disclosure.

Referring to FIGS. 1 to 5, the battery module cooling structure according to one embodiment of the present disclosure includes a battery module 100, a cooling block 200, valve members 300, and support fixtures 400.

The battery module 100 is provided as a plurality of battery modules 100, includes a plurality of battery cells and a cover member, in which the battery cells are accommodated, and is fixed to a vehicle body.

The battery module 100 stores power to be supplied to a high voltage battery system.

The plurality of battery modules 100 are arranged in a horizontal direction.

Preferably, the battery modules 100 may be arranged in the form of two columns and four rows according to a use environment when viewed from above as illustrated in FIG. 1.

Hereinafter, in the present disclosure, the battery modules 100 arranged in the form of two columns and four rows will be described for the sake of convenience in the description.

The plurality of battery modules 100 are described to be arranged in the form of two columns and four rows, but are not limited thereto, and may be various arranged according to a use environment.

Meanwhile, the battery cell of the present disclosure may be manufactured as one of various types and may be manufactured as a pouch type preferably.

In the pouch type battery cell, since a flexible aluminum laminate sheet is used as an exterior member, the pouch type battery cell is formed in a form which is easily bent.

Since a shape of the pouch type battery cell may be relatively freely formed, and the pouch type battery cell is lightweight, the pouch type battery cell is mainly used in the battery module 100 for a vehicle in which a plurality of battery cells should be provided.

The cooling block 200 is in contact with the battery modules 100, and cooling water flows in the cooling block 200 to cool heat of the battery modules 100.

To this end, the cooling water for cooling the battery modules 100 flows into the cooling block 200.

The cooling water flows in the cooling block 200, and the cooling block 200 absorbs heat generated in the battery modules 100 when the battery modules 100 are charged or discharged.

The cooling block 200 include a first cooling module 210, a second cooling module 220, and the valve members 300.

The first cooling module 210 is positioned at any one portion of upper or lower portions of the battery modules 100.

In the present disclosure, the first cooling module 210 is positioned at the lower portion of the plurality of battery modules 100 preferably as illustrated in the drawings.

In addition, in the first cooling module 210, the cooling water flows to cool the plurality of battery modules 100 at the same time.

The first cooling module 210 includes a first cooling plate 211, an inlet pipe 212, an outlet pipe 213, a first connecting pipe 214, and a second connecting pipe 215.

The first cooling plate 211 may be formed in a quadrangular shape and constitutes a body of the first cooling module 210, and the cooling water flows in the first cooling plate 211.

The inlet pipe 212 is formed in the form of a hollow pipe and coupled to an upper portion of the first cooling plate 211.

In addition, the inlet pipe 212 allows the cooling water to flow into the first cooling plate 211 from the outside.

The outlet pipe 213 is formed in the form of a hollow pipe and coupled to the upper portion of the first cooling plate 211 at a position spaced apart from the inlet pipe 212.

In addition, the outlet pipe 213 allows the cooling water to flow from the inlet pipe 212, flow in the first cooling plate 211, cool the plurality of battery modules 100, and then be discharged.

Meanwhile, the first cooling module 210 and the second cooling module 220 are connected so that the cooling water flows therebetween.

To this end, the first connecting pipe 214 and the second connecting pipe 215 are positioned between the first cooling module 210 and the second cooling module 220.

One end of the first connecting pipe 214 is coupled to the first cooling plate 211, and the other end thereof is coupled to the second cooling module 220.

In addition, one end of the second connecting pipe 215 is coupled to the first cooling plate 211, and the other end thereof is coupled to the second cooling module 220 at a position spaced apart from the first connecting pipe 214.

In the first connecting pipe 214, the cooling water flows from the first cooling plate 211 to the second cooling module 220, and in the second connecting pipe 215, the cooling water flows from the second cooling module 220 to the first cooling plate 211.

That is, the cooling water easily flows between the first cooling module 210 and the second cooling module 220 due to the first connecting pipe 214 and the second connecting pipe 215.

Specifically, one end of the first connecting pipe 214 is connected to the inlet pipe 212 in second cooling plates 221, and one end of the second connecting pipe 215 is connected to the outlet pipe 213 in the second cooling plates 221.

That is, the cooling water introduced through the inlet pipe 212 may flow to the first connecting pipe 214, and the cooling water discharged through the second connecting pipe 215 may flow to the outlet pipe 213.

Accordingly, when the cooling water introduced through the inlet pipe 212 flows to the first connecting pipe 214, the cooling water introduced through the inlet pipe 212 may be effectively blocked from flowing to the second connecting pipe 215.

In addition, when the cooling water discharged through the second connecting pipe 215 flows to the outlet pipe 213, the cooling water discharged through the second connecting pipe 215 may be effectively blocked from flowing to the inlet pipe 212.

The second cooling module 220 is positioned at the other portion of upper or lower portions of the battery module 100.

In the present disclosure, the second cooling module 220 is positioned at the upper portion of the plurality of battery modules 100 preferably as illustrated in the drawings.

The second cooling module 220 receives the cooling water from the first cooling module 210 through the first connecting pipe 214.

In addition, the second cooling module 220 may selectively cool only any one of the plurality of battery modules 100.

Specifically, the second cooling module 220 selectively cools the battery module 100 of which cooling efficiency is low because the cooling water, which is already heated to a high temperature due to heat exchange, comes into contact with the battery module 100 disposed close to the inlet pipe 212 among the plurality of battery modules 100 sequentially disposed when the plurality of battery modules 100 are cooled by the first cooling module 210.

Accordingly, since the second cooling module 220 may uniformly cool each of the plurality of battery modules 100 to an optimum temperature, cooling efficiency of the plurality of battery modules 100 can be improved significantly.

Particularly, by increasing a flow rate of the cooling water in the cooling block 200 to cool the battery module 100 coming into contact with the cooling water already heated to a high temperature, the battery module 100 disposed close to the inlet pipe 212 may be prevented from being excessively cooled, and cooling efficiency thereof is prevented from being decreased.

Meanwhile, although it has been described that the second cooling module 220 selectively cools only one of the plurality of battery modules 100, the second cooling module 220 may also cool the plurality of battery modules 100 at the same time.

Accordingly, since the second cooling module 220 may cool the plurality of battery modules 100 at the same time, the second cooling module 220 may more effectively cool the plurality of battery modules 100 along with the first cooling module 210.

The second cooling module 220 includes the second cooling plates 221, a circulation path 226, a discharge path 227, and a connection path 228.

The number of the second cooling plates 221 corresponds to the plurality of battery modules 100, and the cooling water flows in the second cooling plates 221.

The second cooling plates 221 include body parts 222, inlet parts 223, discharge parts 224, and cooling paths 225.

The body part 222 is a body part 222 of the second cooling plate 221, an accommodation space, in which the cooling path 225 is positioned, is formed in the body part 222, and the body part 222 is formed in a quadrangular shape.

The number of body parts 222 corresponds to the plurality of battery modules 100, and each of the body parts 222 is positioned at the upper portion of one of the plurality of battery modules 100.

The inlet part 223 is formed in a pipe shape, receives the cooling water from the circulation path 226, and allows the cooling water to flow to the body part 222.

That is, one end of the inlet part 223 communicates with the body part 222, and the other end thereof communicates with the circulation path 226 so that the body part 222 communicates with the circulation path 226.

The discharge part 224 is formed in a pipe shape, receives the cooling water from body part 222, and allows the cooling water to flow to the discharge path 227.

That is, one end of the discharge part 224 communicates with the discharge path 227, and the other end thereof communicates with the body part 222 in a direction opposite to a direction in which the inlet part 223 is positioned so that the body part 222 communicates with the discharge path 227.

The cooling path 225 is formed in a pipe shape and positioned in the accommodation space of the body part 222.

In addition, when the cooling water flows into the cooling path 225 from the outside, the cooling path 225 cools the battery module 100 disposed under the body part 222.

To this end, one end of the cooling path 225 is connected to the inlet part 223, and the other end thereof is connected to the discharge part 224.

Accordingly, the cooling path 225 receives the cooling water from the inlet part 223, and the cooling water flows in the cooling path 225 to cool the battery module 100 disposed under the body part 222 and is discharged through the discharge part 224.

The circulation path 226 receives the cooling water from the first cooling module 210 through the first connecting pipe 214 and allows the cooling water to flow to the battery module 100 which needs to be cooled.

In addition, the inlet parts 223 are disposed between and coupled to an outer circumferential surface of the circulation path 226 and the body parts 222 of the plurality of second cooling plates 221.

That is, when the cooling water introduced from the first connecting pipe 214 reaches the battery module 100, which needs to be cooled, among the plurality of battery modules 100, the circulation path 226 allows the cooling water to flow into the body part 222 of the second cooling plate 221 through the inlet disposed between the circulation path 226 and the body part 222 of the second cooling plate 221.

The circulation path 226 is positioned around outer circumferential surfaces of the plurality of second cooling plates 221 to surround all of the plurality of second cooling plates 221.

The discharge path 227 is positioned between the plurality of battery modules 100 arranged in the form of two columns.

In addition, the discharge parts 224 are disposed between and coupled to an outer circumferential surface of the discharge path 227 and the body parts 222 of the plurality of second cooling plates 221.

The discharge path 227 receives the cooling water which cools the battery module 100, which needs to be cooled, from the body part 222 of the second cooling plate 221 through the discharge part 224 and discharges the cooling water to the connection path 228.

The discharge path 227 allows the cooling water discharged from the body part 222 of the second cooling plate 221 through the discharge part 224 to be discharged to the first cooling module 210.

An outer circumferential surface of the connection path 228 is coupled to the first connecting pipe 214 and the second connecting pipe 215, and the connection path 228 communicates with the inlet pipe 212 and the outlet pipe 213 through the first connecting pipe 214 and the second connecting pipe 215.

That is, the connection path 228 allows the cooling water introduced from the first connecting pipe 214 to flow to the circulation path 226 and allows the cooling water introduced from the discharge path 227 to flow to the first cooling module 210 through the second connecting pipe 215.

Specifically, the connection path 228 receives the cooling water from the inlet pipe 212 through the first connecting pipe 214, allows the cooling water to flow to the circulation path 226, and discharges the cooling water to the outlet of the first cooling module 210 through the second connecting pipe 215.

Meanwhile, a partition wall 229 is formed between the first connecting pipe 214 and the discharge path 227 in the connecting pipe.

The partition wall 229 prevents the cooling water introduced from the first connecting pipe 214 from being mixed with the cooling water discharged from the discharge path 227 and discharged to the second connecting pipe 215.

That is, the partition wall 229 allows the cooling water introduced from the first connecting pipe 214 to flow to the circulation path 226.

Meanwhile, the valve members 300 are positioned between the circulation path and the inlet and between the discharge path 227 and the discharge part 224.

The number of valve members 300 corresponds to the plurality of battery modules 100, and the valve members 300 are connected to the second cooling module 220 to allow the cooling water to selectively flow to the second cooling module 220.

That is, the valve member 300 may be formed in a 3-way structure, and the cooling water introduced from the inlet pipe 212 may flow into the second cooling module 220 according to whether the valve member 300 is opened.

The valve members 300 include inlet valves 310 and discharge valves 320.

The number of the inlet valves 310 corresponds to the plurality of battery modules 100, and the inlet valves 310 are coupled to the circulation path 226 and control the cooling water flowing in the circulation path 226.

Specifically, the inlet valve 310 communicates with the circulation path 226 in one and the other directions and communicates with the inlet part 223 in a direction in which the body part 222 of the second cooling plate 221 is positioned between the one and the other direction.

In addition, when any one of the plurality of battery modules 100 should be cooled, as illustrated in FIGS. 4 and 5, the inlet valve 310, which is positioned at a position corresponding to the battery module 100 to be cooled, among the plurality of inlet valves 310 opens the circulation path 226_1 in a direction in which the cooling water flows.

At the same time, the circulation path 226_2 is closed in a direction in which the cooling water is discharged, and the inlet part 223 is opened.

That is, the inlet valve 310 opens the circulation path 226_1 in the direction in which the cooling water is introduced and closes the circulation path 226_2 in the direction in which the cooling water is discharged.

Accordingly, the cooling water introduced into the circulation path 226_1 may flow into the cooling path 225 of the second cooling plate 221 through the open inlet part 223.

In this case, the inlet valve 310 positioned between the connection path 228 and the battery module 100 cooled by the second cooling plate 221 opens the circulation path 226 coupled to the inlet valve 310 in the one and the other directions.

Accordingly, the cooling water flows through the inlet valve 310, which is opened in the one and the other directions, to the inlet valve 310 corresponding to the battery module 100 to be cooled.

Accordingly, the inlet valve 310 may selectively cool only the battery module 100 to be cooled among the plurality of battery modules 100.

Meanwhile, the meaning of selectively cooling only any one of the plurality of battery modules 100 is that the second cooling module 220 cools only one battery module 100, which is particularly and excessively heated, among the plurality of battery modules 100 and does not cool the plurality of battery modules 100 at the same time.

The discharge valves 320 are coupled to the discharge path 227 and control the cooling water flowing in the discharge path 227.

Specifically, the discharge valve 320 communicates with the discharge path 227 in one and the other directions and communicates with the discharge part 224 in a direction in which the second cooling plate 221 is positioned between the one and the other directions.

In addition, as illustrated in FIGS. 4 and 5, the discharge valve 320 opens the discharge part 224 to allow the cooling water, which cools the battery module 100, to be discharged through the discharge part 224.

At the same time, in the discharge path 227_2 connected to one end and the other end of the discharge valve 320, the discharge path 227_1 is opened in a direction in which the connection path 228 is positioned, and the discharge path 227_2, which is connected to the other end of the discharge valve 320, is closed in a direction opposite to the direction in which the connection path 228 is positioned.

That is, when the cooling water is discharged from the cooling path 225, the discharge part 224 may be opened, the discharge path 227_2 may be closed in a direction in which the cooling water is introduced, the discharge path 227_1 may be opened in a direction in which the cooling water is discharged, and thus the discharge path 227_1 may discharge the cooling water in the direction in which the connection path 228 is positioned.

In this case, the discharge valve 320 positioned between the connection path 228 and the battery module 100 cooled by the second cooling plate 221 opens the discharge path 227 coupled to the discharge valve 320 in the one and the other directions.

Accordingly, the discharge valve 320 may easily discharge the cooling water which cools the battery module 100, which needs to be cooled, among the plurality of battery modules 100 to the connection path 228.

One end of the support fixture 400 is coupled to the first cooling module 210, and the other end thereof is coupled to the second cooling module 220 so that the second cooling module 220 is supported by the first cooling module 210.

Accordingly, the support fixture 400 may firmly support the second cooling module 220 which is shaken due to the flow of the cooling water when the cooling water flows in the second cooling module 220.

According to the present disclosure, since a second cooling module can uniformly cool each of a plurality of battery modules to an appropriate temperature, cooling efficiency of the plurality of battery modules can be increased significantly.

In addition, since any one of the plurality of battery modules is selectively cooled, it is prevented that the battery module disposed close to an inlet pipe is excessively cooled by increasing a flow rate of the cooling water in the cooling module in order to cool a battery module coming into contact with cooling water already heated to a high temperature.

In addition, since the second cooling module can cool the plurality of battery modules at the same time, the second cooling module can cool the plurality of battery modules more effectively along with a first cooling module.

As described above, the embodiment disclosed in the present specification should be considered in a descriptive sense only and not for purposes of limitation, the scope of the present disclosure is defined not by the above description but by the appended claims, and it should be interpreted that the scope of the present disclosure encompasses all differences falling within equivalents of the appended claims.

What is claimed is:

1. A battery module cooling structure comprising:
a plurality of battery modules fixed to a vehicle body;
a cooling block, in which cooling water flows, disposed to be in contact with the plurality of battery modules to cool the plurality of battery modules; and
a plurality of valve members coupled to the cooling block and configured to control the cooling water to selectively flow in the cooling block,
wherein the cooling block comprises a first cooling module including a first cooling plate which constitutes a body of the first cooling module and in which the cooling water flows and a second cooling module including a plurality of second cooling plates of which the number corresponds to the plurality of the battery modules and in which the cooling water flows,
wherein the first cooling module is disposed at any one of upper or lower portions of the plurality of battery modules, and the second cooling module is positioned at a remaining one of the upper or lower portions of the plurality of battery modules, and
wherein the first cooling module further includes:
an inlet pipe which is coupled to the first cooling plate and allows the cooling water to flow into the first cooling plate from an outside of the battery module cooling structure;
an outlet pipe which is coupled to the first cooling plate at a position spaced apart from the inlet pipe and allows the cooling water to be discharged from the first cooling plate to the outside;
a first connecting pipe having one end coupled to the first cooling plate and another end coupled to the second cooling module; and
a second connecting pipe disposed at a position spaced apart from the first connecting pipe and having one end coupled to the first cooling plate and another end coupled to the second cooling module.

2. The battery module cooling structure of claim 1, wherein the second cooling module selectively cools any one or all of the plurality of battery modules at the same time.

3. The battery module cooling structure of claim 1, wherein:
the first connecting pipe communicates with the inlet pipe; and
the second connecting pipe communicates with the outlet pipe.

4. The battery module cooling structure of claim 1, wherein:
in the first connecting pipe, the cooling water flows from the first cooling plate to the second cooling module; and in the second connecting pipe, the cooling water flows from the second cooling module to the first cooling plate.

5. The battery module cooling structure of claim 1, wherein the second cooling module further includes:
a circulation path in which cooling water introduced into the second cooling plate flows;
a discharge path in which the cooling water discharged from the second cooling plate flows; and
a connection path which communicates with the circulation path and the discharge path and is connected to the first connecting pipe and the second connecting pipe.

6. The battery module cooling structure of claim 5, wherein each of the plurality of second cooling plates includes:
a body part having an accommodation space defined therein;
an inlet part which allows the body part and the circulation path to communicate with each other;
a discharge part which allows the body part and the discharge path to communicate with each other; and
a cooling path which is positioned in the accommodation space of the body part and has one end coupled to the inlet part and another end coupled to the discharge part.

7. The battery module cooling structure of claim 5, wherein the connection path allows:
the cooling water introduced from the first connecting pipe to flow to the circulation path; and
the cooling water introduced from the discharge path to flow to the first cooling module through the second connecting pipe.

8. The battery module cooling structure of claim 5, wherein a partition wall is positioned between the first connecting pipe and the discharge path in the connection path.

9. The battery module cooling structure of claim 6, wherein each of the plurality of valve members includes:
an inlet valve which is coupled to the circulation path and is configured to control the cooling water flowing in the circulation path; and
a discharge valve which is coupled to the discharge path and is configured to control the cooling water flowing in the discharge path.

10. The battery module cooling structure of claim 9, wherein:
the inlet valve of each of the plurality of valve members communicates with the circulation path in one and the other directions of the circulation path and communicates with the inlet part of a corresponding one of the plurality of second cooling plates in a direction in which the corresponding one is positioned between the one and the other directions of the circulation path; and
the discharge valve of each of the plurality of valve members communicates with the discharge path in one and the other directions of the discharge path and communicates with the discharge part of a corresponding one of the plurality of second cooling plates in a direction in which the corresponding one is positioned between the one and the other directions of the discharge path.

11. The battery module cooling structure of claim 10, wherein the inlet valve positioned at a position corresponding to the battery module to be cooled among the plurality of battery modules opens the circulation path in a direction in which the cooling water is introduced, closes the circulation path in a direction in which the cooling water is discharged, and opens the inlet part of the battery module to be cooled so that the cooling water flows into the cooling path.

12. The battery module cooling structure of claim 11, wherein the inlet valve positioned between the connection path and the battery module cooled by the corresponding one of the plurality of second cooling plates opens the circulation path coupled to the inlet valve in the one and the other directions of the circulation path.

13. The battery module cooling structure of claim 10, wherein when the cooling water is discharged from the cooling path, the discharge valve opens the discharge part, closes the discharge path in a direction in which the cooling water is introduced, and opens the discharge path in a direction in which the cooling water is discharged so that the cooling water is discharged in a direction in which the connection path is positioned.

14. The battery module cooling structure of claim 13, wherein the discharge valve positioned between the connection path and the battery module cooled by the corresponding one of the plurality of second cooling plates opens the discharge path coupled to the discharge valve in the one and the other directions.

\* \* \* \* \*